US012606131B2

(12) United States Patent
Ito

(10) Patent No.: US 12,606,131 B2
(45) Date of Patent: Apr. 21, 2026

(54) VEHICLE CONTROL DEVICE

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 18/767,445

(22) Filed: Jul. 9, 2024

(65) Prior Publication Data

US 2025/0033612 A1      Jan. 30, 2025

(30) Foreign Application Priority Data

Jul. 24, 2023    (JP) ................................. 2023-119874

(51) Int. Cl.
*B60T 7/12* (2006.01)
*B60T 13/12* (2006.01)
(Continued)

(52) U.S. Cl.
CPC ................. *B60T 7/12* (2013.01); *B60T 13/12* (2013.01); *B60T 13/58* (2013.01); *B60T 13/66* (2013.01);
(Continued)

(58) Field of Classification Search
CPC . B60T 7/12; B60T 13/12; B60T 13/58; B60T 13/66; B60T 2220/00; B60T 7/14;
(Continued)

(56) References Cited

U.S. PATENT DOCUMENTS 10,166,866 B2    1/2019  Otake
10,220,825 B2    3/2019  Otake et al.
(Continued)

FOREIGN PATENT DOCUMENTS

JP        2016-85563  A      5/2016
JP        2020019320  A   *  2/2020
(Continued)

OTHER PUBLICATIONS

Machine translation of JP-2020019320-A (Year: 2020).*
Machine translation of KR-20210023147-A (Year: 2021).*

*Primary Examiner* — Navid Z. Mehdizadeh
*Assistant Examiner* — Caitlin R McCleary
(74) *Attorney, Agent, or Firm* — Sughrue Mion, PLLC

(57) ABSTRACT

To effectively improve the accuracy of abnormality determination of a driver, provided is a vehicle control device comprising a stop hold release control unit configured to execute a stop hold control for holding by activating a brake apparatus, and execute a release control for releasing a stop hold by the brake apparatus when a predetermined release condition is satisfied, an operation input acquiring unit for acquire an operation input of a driver, a driver abnormality determining unit for determining whether the driver is in an abnormal state, and a determination correction unit configured to execute a determination correction for making the driver abnormality determination unit easily determine that the driver is in the abnormal state, when the release control is executed by the stop hold release control unit and the operation input acquisition unit does not acquire the operation input.

1 Claim, 4 Drawing Sheets

(51) Int. Cl.

| | | |
|---|---|---|
| *B60T 13/58* | (2006.01) | |
| *B60T 13/66* | (2006.01) | |
| *B60W 60/00* | (2020.01) | |

(52) U.S. Cl.

CPC ........ *B60T 2220/00* (2013.01); *B60W 60/001* (2020.02); *B60W 2710/18* (2013.01)

(58) Field of Classification Search

CPC .......... B60W 60/001; B60W 2710/18; B60W 30/18054; B60W 2050/143; B60W 2540/221; B60W 2540/26; B60W 2710/182; B60W 2756/10; B60W 50/14; B60W 60/0015; B60W 2040/0818

See application file for complete search history.

(56) References Cited

U.S. PATENT DOCUMENTS

| | | | |
|---|---|---|---|
| 10,239,537 B2 | 3/2019 | Otake | |
| 10,589,743 B2 | 3/2020 | Otake | |
| 11,021,156 B2 | 6/2021 | Uejima | |
| 11,110,934 B2 | 9/2021 | Watanabe et al. | |
| 11,299,153 B2 | 4/2022 | Tanaka | |
| 2017/0261981 A1* | 9/2017 | Ichikawa ............ | B60W 50/082 |
| 2021/0171000 A1* | 6/2021 | Hesseler ................. | B60T 8/172 |
| 2021/0362729 A1 | 11/2021 | Watanabe et al. | |

FOREIGN PATENT DOCUMENTS

| | | | | |
|---|---|---|---|---|
| JP | 2024-5618 A | 1/2024 | | |
| KR | 20210023147 A | * 3/2021 | ............ | B60W 40/10 |

* cited by examiner

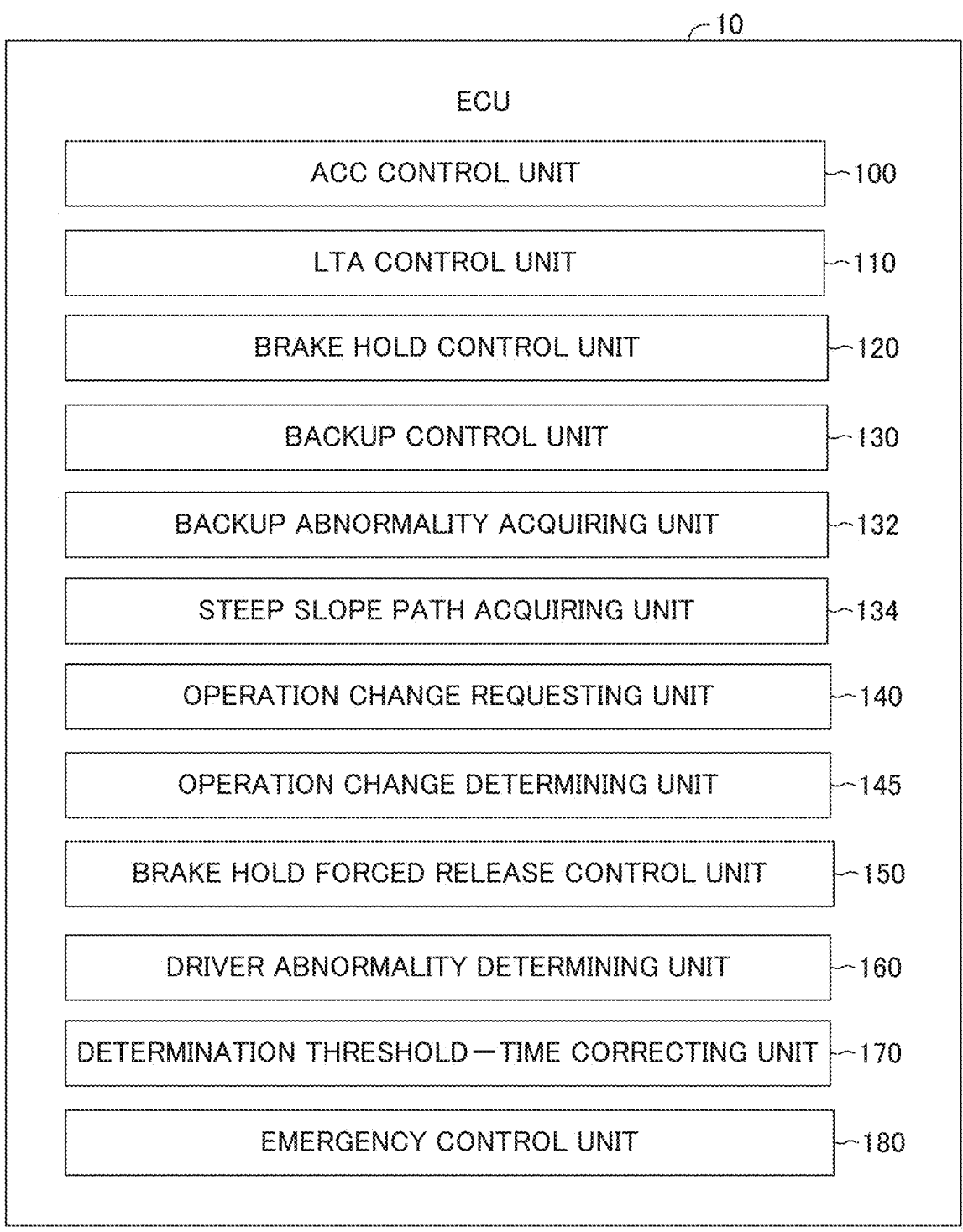

ECU ⌐10

| | |
|---|---|
| ACC CONTROL UNIT | ~100 |
| LTA CONTROL UNIT | ~110 |
| BRAKE HOLD CONTROL UNIT | ~120 |
| BACKUP CONTROL UNIT | ~130 |
| BACKUP ABNORMALITY ACQUIRING UNIT | ~132 |
| STEEP SLOPE PATH ACQUIRING UNIT | ~134 |
| OPERATION CHANGE REQUESTING UNIT | ~140 |
| OPERATION CHANGE DETERMINING UNIT | ~145 |
| BRAKE HOLD FORCED RELEASE CONTROL UNIT | ~150 |
| DRIVER ABNORMALITY DETERMINING UNIT | ~160 |
| DETERMINATION THRESHOLD—TIME CORRECTING UNIT | ~170 |
| EMERGENCY CONTROL UNIT | ~180 |

FIG.2

VEHICLE CONTROL DEVICE

CROSS-REFERENCE TO RELATED APPLICATION

This application claims priority to Japanese Patent Application No. JP2023-119874 filed on Jul. 24, 2023, the content of which is hereby incorporated by reference in its entirety into this application.

BACKGROUND OF THE INVENTION

1. Field of the Invention

The present disclosure relates to a vehicle control device.

2. Description of the Related Art

For example, Japanese Patent Application Laid-Open (kokai) No. 2016-085563 discloses a device in which an in-vehicle alarm is executed when an abnormality of a driver is detected from an image of a driver camera, an in-vehicle alarm is executed when a driver does not respond even if a first time elapses from execution of an in-vehicle alarm, and a risk avoidance process such as hazard blinking, deceleration, and road shoulder retraction is executed when a driver does not respond even if a second time elapses from execution of an out-of-vehicle alarm.

Even when the device determines that no abnormality has occurred in the driver based on the image of the driver camera, there is a limit to the determination based on the image analysis, and in some cases, an abnormality has actually occurred. That is, it can be said that there is room for improvement in the accuracy of the abnormality determination of the driver.

SUMMARY OF THE INVENTION

The present disclosure has been made to solve the above problems. That is, an object of the present disclosure is to effectively improve the accuracy of abnormality determination of a driver.

A device according to at least one embodiment of the present disclosure is a vehicle control device. The vehicle control device comprising, a stop hold release control unit configured to execute a stop hold control for holding the vehicle in a stopped state by activating a brake apparatus when the vehicle is stopped, and execute a release control for releasing a stop hold by the brake apparatus when a predetermined release condition is satisfied during execution of the stop hold control; an operation input acquiring unit for acquire an operation input of a driver of the vehicle, a driver abnormality determining unit for determining whether the driver is in an abnormal state, and a determination correction unit configured to execute a determination correction for making the driver abnormality determination unit easily determine that the driver is in the abnormal state or determines that the driver is in the abnormal state, when the release control is executed by the stop hold release control unit and the operation input acquisition unit does not acquire the operation input of the driver.

BRIEF DESCRIPTION OF THE DRAWINGS

FIG. 2 is a schematic diagram showing a software configuration of a control device to the present embodiment;

DESCRIPTION OF THE EMBODIMENTS

Description is now given of a vehicle control device according to at least one embodiment of the present disclosure with reference to the drawings.

<Hardware Configuration>

Figure 1:
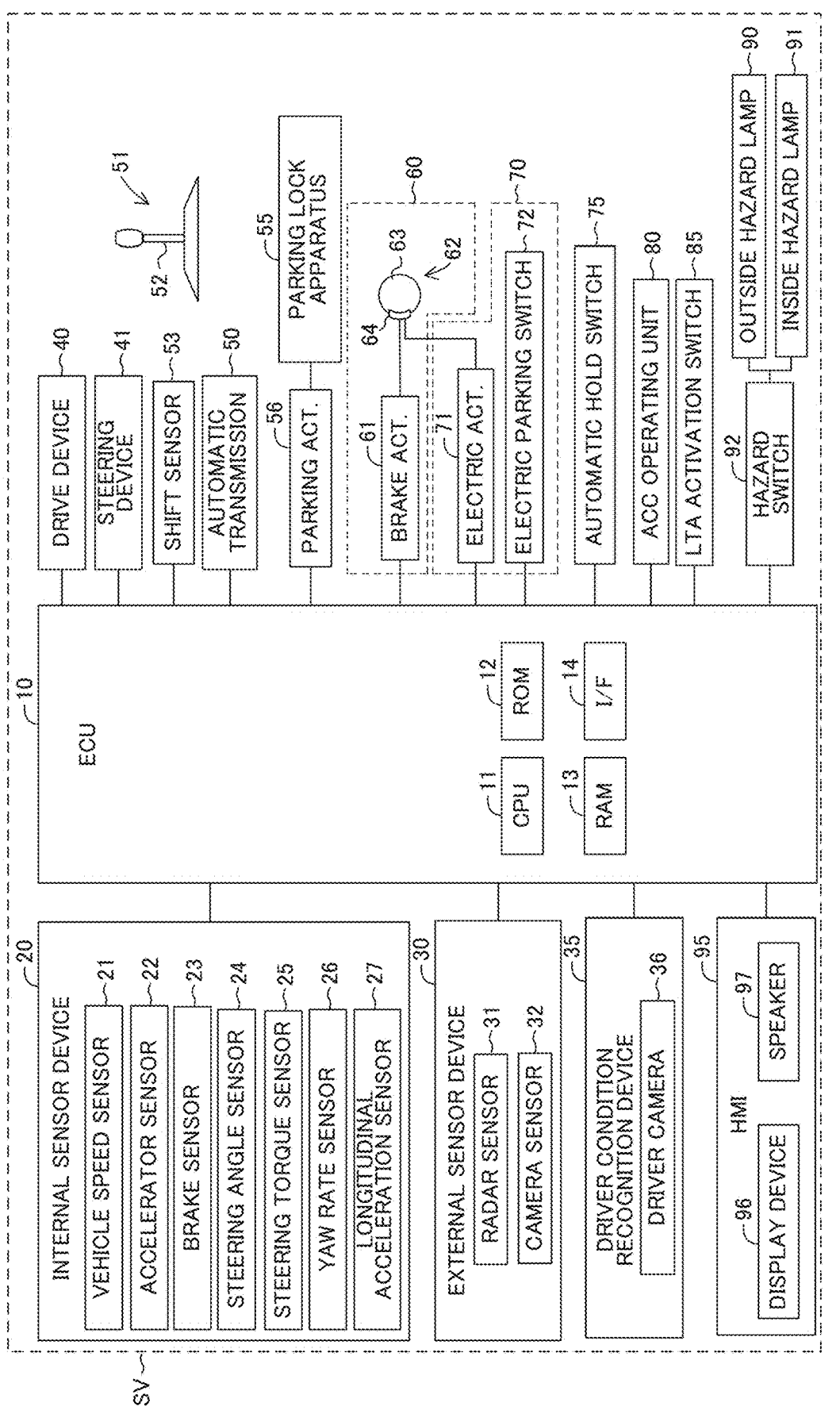
FIG. 1 is a schematic diagram showing a hardware configuration of a vehicle according to the present embodiment.

FIG. 1 is a schematic diagram of a hardware configuration of a vehicle SV according to the present embodiment. Hereinafter, the vehicle SV may be referred to as an own vehicle when it is required to distinguish it from other vehicles.

The vehicle SV has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes a driver assistance control of the vehicle SV, such as an Adaptive Cruise Control (ACC) and Lane Trace Assist (LTA), and the like. An internal sensor device 20, an external sensor device 30, a driver condition recognition device 35, a drive device 40, a steering device 41, an automatic transmission 50, a parking lock apparatus 55, a hydraulic brake apparatus 60, an electric parking brake apparatus 70, an ACC operating unit 80, a LTA activation switch 85, an outside hazard lamp 90, an inside hazard lamp 91, a HMI (Human Machine Interface) 95, and the like are communicably connected to the ECU 10.

The internal sensor device 20 is sensors which acquire states of the vehicle SV. Specifically, the internal sensor device 20 includes a vehicle speed sensor 21, an accelerator sensor 22, a brake sensor 23, a steering angle sensor 24, a steering torque sensor 25, a yaw rate sensor 26, a longitudinal acceleration sensor 27, and the like.

The vehicle speed sensor 21 detects a traveling speed (vehicle speed) of the vehicle SV. The accelerator sensor 22 detects an amount of operation on an accelerator pedal (not shown) by a driver. The brake sensor 23 detects an amount of operation on a brake pedal (not shown) by the driver. The steering angle sensor 24 detects a rotation angle of a steering wheel or a steering shaft of the steering device 41, that is, a steering angle. The steering torque sensor 25 detects a rotational torque of the steering wheel or the steering shaft of the steering device 41, that is, a steering torque. The yaw rate sensor 26 detects a yaw rate of the vehicle SV. The longitudinal acceleration sensor 27 detects a longitudinal acceleration G of the vehicle SV. The internal sensor device 20 transmits the conditions of the vehicle SV acquired by the sensors 21 to 27 to the ECU 10 at predetermined intervals.

The external sensor device 30 is sensors which acquire object information on objects around the vehicle SV. Specifically, the external sensor device 30 includes a radar sensor 31, a camera sensor 32, etc. Examples of the pieces of object information include surrounding vehicles, white lines on roads, traffic signs, etc.

The radar sensor 31 detects an object that is present around the vehicle SV. The radar sensor 31 includes a millimeter wave radar and/or an LiDAR. The millimeter wave radar radiates a radio wave in the millimeter wave band (millimeter wave) and receives a millimeter wave (reflection wave) reflected by an object present in the region to which the millimeter wave is radiated. The millimeter wave radar obtains the relative distance between the vehicle SV and the object, the relative speed between the vehicle SV and the object, etc. on the basis of the phase difference between the transmitted millimeter wave and the received reflection wave, the level of attenuation of the reflection wave, the time elapsed until the reflection wave is received after the millimeter wave has been transmitted, etc. The LiDAR emits pulses of laser light having a wavelength shorter than that of the millimeter wave in different directions sequentially through scanning operation, and receives reflection light from an object, thereby obtaining the shape of the object detected ahead of the vehicle SV, the relative distance between the vehicle SV and the object, the relative speed between the vehicle SV and the object, etc.

The camera sensor 32 obtains image data by capturing an image of a scene around the vehicle SV and processes the obtained image data, thereby obtaining a piece of information regarding an object information located around the vehicle SV. As the camera sensor 32, for example, a digital camera having an image sensor such as a CMOS or a CCD can be used. The object information is a piece of information which represents the type of the object detected around the vehicle SV, the relative distance between the vehicle SV and the object, the relative speed between the vehicle SV and the object, etc. The type of the object may be recognized, for example, by machine learning such as pattern matching or the like.

The external sensor device 30 repeatedly transmits the obtained object information to the ECU 10 every time a predetermined time elapses. Notably, the external sensor device 30 is not necessarily required to include both the radar sensor 31 and the camera sensor 32, and may include the radar sensor 31 only or the camera sensor 32 only.

The driver condition recognition device 35 recognizes conditions of the driver of the vehicle SV, and includes a driver camera 36, and the like. The driver camera 36 mainly captures an image of the driver's face. The driver condition recognition device 35 transmits the conditions of the driver (hereinafter referred to as "driver condition information") such as a line-of-sight direction and an eye open state of the driver acquired based on the detection results from the driver camera 36 to the ECU 10 at predetermined intervals. The driver condition recognition device 35 is not limited to the driver camera 36, and may include other sensors capable of acquiring driver condition information, such as a physiological measurement device that detects a heart rate or a pulse rate of the driver.

The drive device 40 generates a driving force to be transmitted to driving wheels of the vehicle SV. As the drive device 40, for example, an engine and a motor are given. In the device according to the at least one embodiment, the vehicle SV may be any one of a hybrid electric vehicle, a plug-in hybrid electric vehicle, a fuel cell electric vehicle, a battery electric vehicle and an engine vehicle. The steering device 41 applies steering forces to steerable wheels of the vehicle SV.

The automatic transmission 50 is disposed in a power transmission path between the drive apparatus 40 and the drive wheels. The automatic transmission 50 transmits the drive power output from the drive apparatus 40 to the drive wheels while reducing the speed at a predetermined reduction ratio. The automatic transmission 50 is, for example, a shift-by-wire-type automatic transmission and includes a shift operation apparatus 51, a shift sensor 53, etc.

The shift operation apparatus 51 includes a select lever 52 and the shift sensor 53. The driver can select a desired shift position by operating the select lever 52. For example, a parking position P, a reverse position R, a neutral position N, a drive position D, a home position H, etc. are set as shift positions of the shift operation apparatus 51. The shift sensor 53 transmits a range signal indicating the shift range selected by the select lever 52 to the ECU 10.

The parking lock apparatus 55 is provided on the output side of the automatic transmission 50. The parking lock apparatus 55 includes a parking gear provided on a power transmission shaft (for example, the output shaft of the automatic transmission 50), a parking pole which can be engaged with the parking gear, a parking actuator 56 for moving the parking pole, etc.

Operation of the parking actuator 56 is controlled in accordance with an instruction from the ECU 10. Specifically, when the ECU 10 receives from the shift sensor 53 a shift position signal indicating the parking position P, the ECU 10 controls the operation of the parking actuator 56 such that the parking pole engages with the parking gear. When the parking pole engages with the parking gear, the power transmission shaft is fixed so as to establish a parking lock in which rotation of the drive wheels is prevented. Meanwhile, in the case where, in a state in which the parking lock has been established, the select lever 52 is moved from the parking position P to another shift position; i.e., the ECU 10 receives from the shift sensor 53 a shift position signal indicating a position other than the parking position P, the ECU 10 controls the operation of the parking actuator 56 so as to cancel the engagement of the parking pole with the parking gear.

The hydraulic brake apparatus 60 is, for example, a disc-type brake apparatus and applies braking forces to the wheels of the vehicle SV. The hydraulic brake apparatus 60 includes a brake actuator 61, brake mechanisms 62 provided for the wheels, etc. The brake actuator 61 is provided in a hydraulic circuit between a master cylinder (not shown) which pressurizes operating oil in accordance with a depressing force applied to the brake pedal and the brake mechanisms 62. Each brake mechanism 62 includes a brake disc 63 fixed to a wheel and a brake caliper 64 fixed to the body of the vehicle. The brake actuator 61 adjusts the pressure of oil supplied to a wheel cylinder built in the brake caliper 64 in accordance with an instruction from the ECU 10, whereby the wheel cylinder is operated by the oil pressure. Thus, the brake actuator 61 presses brake pads against the brake disc 63, thereby generating frictional braking force. Notably, the hydraulic brake apparatus 60 is not limited to the disc-type brake apparatus shown as an example and may be a drum-type brake apparatus or the like.

The electric parking brake apparatus 70 includes an electric actuator 71, an electric parking switch 72, etc. The electric actuator 71 and the electric parking switch 72 are connected to the ECU 10.

The electric parking switch 72 is a momentary-type switch whose operation section automatically returns to its neutral position. In the electric parking switch 72, three positions are set; specifically, a neutral position at which the operation section is located when not operated, an ON position to which the operation section is pulled up from the neutral position, and an OFF position to which the operation section is pushed down from the neutral position. When the operation section is pulled up to the ON position, the electric parking switch 72 transmits an ON signal to the ECU 10. Upon reception of the ON signal from the electric parking switch 72, the ECU 10 controls the operation of the electric actuator 71 so as to press the brake pads against the brake discs 63. As a result, an electric parking brake in which the vehicle SV is maintained in a stopped state is established. Meanwhile, when the operation section is pushed down to the OFF position, the electric parking switch 72 transmits an OFF signal to the ECU 10. Upon reception of the OFF signal from the electric parking switch 72 or an accelerator ON signal transmitted from the accelerator sensor 22, the ECU 10 controls the operation of the electric actuator 71 so as to cancel the electric parking brake.

The automatic hold switch 75 is a momentary-type ON/OFF switch. When the vehicle SV stops in a state in which the automatic hold switch 75 is ON or when the automatic hold switch 75 is turned on in a state in which the vehicle SV is stopped, brake hold control of holding the oil pressures within the wheel cylinders of the hydraulic brake apparatus 60 is started. As a result, the driver can continuously maintain the vehicle SV in the stopped state without depressing the brake pedal. The brake hold control is cancelled when the driver turns off the automatic hold switch 75 or depresses the accelerator pedal.

The ACC operating unit 80 includes, for example, a start switch for selecting whether the driver activates or terminates ACC, a setting switch for setting the target vehicle speed and the target inter-vehicle distance of ACC, a cancel switch for temporarily canceling ACC, a resume switch for resuming ACC, and the like. The LTA activation switch 85 is an ON/OFF switch for selecting whether the drivers activate or terminate LTA.

The outside hazard lamp 90 is provided on the outer side of the vehicle SV. The inside hazard lamp 91 is provided in the vehicle interior of the vehicle SV, and blinks in conjunction with the outside hazard lamp 90. A hazard switch 92 is provided in the vehicle interior of the vehicle SV, and the respective hazard lamps 90 and 91 can be switched on and off by operating the hazard switch 92.

The HMI 95 is an interface for inputting and outputting data between the ECU 10 and the driver, and includes an input device and an output device. Examples of the input device include a touch panel, a switch, and a sound pickup microphone. Examples of the output device include a display device 96 and a speaker 97. The display device 96 is, for example, a center display installed in an instrument panel or the like, a multi-information display, a head-up display, or the like. The speaker 97 is, for example, a speaker of an acoustic system or the navigation system.

<Software Configuration>

FIG. 2 is a schematic diagram showing a software configuration of the control device to the present embodiment. As shown in FIG. 2, the ECU 10 includes an ACC control unit 100, a LTA control unit 110, a brake hold control unit 120, a backup control unit 130, a backup abnormality acquiring unit 132, a steep slope path acquiring unit 134, an operation change requesting unit 140, an operation change determining unit 145, a brake hold forced release control unit 150, a driver abnormality determining unit 160, a determination threshold-time correcting unit 170, an emergency control unit 180, and the like as a part of functional elements. The CPU 11 of the ECU 10 realizes each of these functional elements 100 to 180 by reading a program stored in the ROM 12, loading the read program into the RAM 13, and executing the loaded program. Notably, that all or a part of the functional elements 100 to 180 may be provided in another ECU separate from the ECU 10 or in an information processing device of a facility (a control center or the like) capable of communicating with the vehicle SV.

The ACC control unit 100 is one example of the autonomous driving control unit of the present disclosure and executes the ACC based on the target vehicle speed or the target inter-vehicle distance. The ACC itself is well known. Thus, a brief description is now given of the ACC. The ACC includes two types of control, namely, the constant speed travel control and the follow-up travel control. The constant speed travel control causes the vehicle SV to travel at the target vehicle speed without needing driver's accelerator operation and brake operation. The follow-up travel control causes the own vehicle SV to follow a preceding vehicle such that the inter-vehicle distance between the preceding vehicle and the own vehicle SV is maintained at the target inter-vehicle distance, without needing driver's accelerator operation and brake operation.

When the activation switch of the ACC operation unit 80 is turned on, the ACC control unit 100 determines, on the basis of the detection result of the external sensor device 30, whether or not a preceding vehicle to follow is present. In the case where the ACC control unit 100 determines that no preceding vehicle is present, the ACC control unit 100 executes the constant speed travel control. In this case, the ACC control unit 100 controls the drive apparatus 40 and controls the hydraulic brake apparatus 60 when necessary such that the vehicle speed V coincides with the target vehicle speed. The vehicle speed V may be acquired based on the detection result of the vehicle speed sensor 21. Meanwhile, in the case where the ACC control unit 100 determines that a preceding vehicle is present, the ACC control unit 100 executes the follow-up travel control. In this case, the ACC control unit 100 controls the drive apparatus 40 and controls the hydraulic brake apparatus 60 when necessary such that the inter-vehicle distance between the own vehicle SV and the preceding vehicle coincides with the target inter-vehicle distance. The actual inter-vehicle distance between own vehicle SV and the preceding vehicle may be acquired based on the detection result of the external sensor device 30.

The LTA control unit 110 executes the LTA for automatically changing the steering angle so that a lateral position of the own vehicle SV is maintained near a target travel line in the travel lane. Here, the lateral position of the own vehicle SV is the position of the own vehicle SV in the lane-width direction with respect to the road. The LTA itself is well known. Thus, a brief description is now given of the LTA. During activation of the ACC by the ACC control unit 100, when the LTA activation switch 85 is turned on, the LTA control unit 110 sets the target travel line of the own vehicle SV based on a section line or the like recognized by the external sensor device 30. The LTA control unit 110 changes the steering angle of the vehicle SV by controlling the operation of the steering device 41 so that the lateral position of the vehicle SV is maintained near the target travel line.

When either of the following execution conditions (1) and (2) is satisfied, the brake hold control unit 120 executes brake hold control (stop hold control) of holding the oil pressures of the wheel cylinders of the hydraulic brake apparatus 60, thereby continuously holding the stopped state of the vehicle SV. The brake hold control unit 120 is one example of the stop hold release control unit of the present disclosure.

Execution condition (1): When the automatic hold switch 75 is turned ON and the driver stops the vehicle SV, or when the automatic hold switch 75 is turned OFF and the driver stops the vehicle SV and then turned ON the automatic hold switch 75.

Execution condition (2): When the own vehicle SV stops following the stop of the preceding vehicle while the follow-up travel control by the ACC is being executed.

When any of the following end conditions (1) to (3) is satisfied, the brake hold control unit 120 ends the brake hold control; namely, cancels the operation of holding the oil pressure of the hydraulic brake apparatus 60.

End condition (1): After the brake hold control has been started as a result of satisfaction of the execution condition (1), the driver performs a cancellation operation; i.e., the driver turns off the automatic hold switch 75 in a state in which the brake pedal is depressed, or the driver depresses the accelerator pedal.

End condition (2): After the brake hold control has been started as a result of satisfaction of the execution condition (2), the driver performs a cancellation operation (namely, an ACC resuming or starting operation); i.e., the driver turns on the resuming switch of the ACC operating unit 80 or depresses the accelerator pedal.

End condition (3): After the brake hold control has been started as a result of satisfaction of the execution condition (1) or (2), the time during which the brake hold control has been executed (brake hold control execution time) reaches a predetermined threshold time Tm without the cancellation operation by the driver.

No particular limitation is imposed on the threshold time Tm of the end condition (3), and the threshold time Tm may be appropriately set in consideration of the specifications, performances, etc. of the vehicle SV and the hydraulic brake apparatus 60.

When the above-described end condition (3) is satisfied, the backup control section 130 executes backup control of holding the vehicle SV in the stopped state by activating both or either of the electric parking brake apparatus 70 and the parking lock apparatus 55. As a result, the backup for holding the vehicle SV in the stopped state without fail even after the end of the brake hold control is established. Note that the backup control unit 130 does not execute the backup control when at least one of a backup abnormality signal and a steep slope signal, which will be described later, is received during the execution of the brake hold control by the brake hold control unit 120.

The backup abnormality acquiring unit 132 acquires whether the electric parking brake apparatus 70 or the parking lock apparatus 55 is in an abnormal state that cannot be operated for any reason (for example, an actuator failure or the like). When the abnormal state of the electric parking brake apparatus 70 or the parking lock apparatus 55 is acquired, the backup abnormality acquiring unit 132 transmits a "backup abnormality signal" indicating that the abnormal state is present to the backup control unit 130 and the operation change requesting unit 140, which will be described later, respectively. The abnormal state may include not only an actuator failure but also an unintended erroneous operation of the automatic hold switch 75 or the select lever 52 by the driver.

The steep slope path acquiring unit 134 acquires whether or not it is physically impossible to maintain the vehicle SV in a stopped condition even if the electric parking brake apparatus 70 or the parking lock apparatus 55 is operated when the vehicle SV is stopped, that is, whether or not the steep road exceeds the allowable limit of the above-described backup control. When the road surface gradient θ is larger than the predetermined upper limit threshold gradient θm, the steep slope path acquiring unit 134 transmits a "steep slope signal" indicating that the current road is a steep slope path exceeding the allowable limit of the backup control to the backup control unit 130 and the operation change requesting unit 140, which will be described later, respectively. The road surface gradient θ may be calculated based on the acceleration G in the front-rear direction detected by the longitudinal acceleration sensor 27, or may be directly acquired by the gradient sensor as long as the vehicle SV includes the gradient sensor. The upper limit threshold gradient θm is not particularly limited, and may be appropriately set according to the specific performance of the electric parking brake apparatus 70 and the parking lock apparatus 55.

When at least one of the backup abnormality signal and the steep slope signal is received during the execution of the brake hold control by the brake hold control unit 120, that is, when the limit state of the backup control is detected, the operation change requesting unit 140 executes an operation change request that prompts the driver to change the operation. The operation change requesting unit 140 displays, as an operating change request, a message prompting the driver to perform a braking operation on the display device 96, for example. Note that the operating change request is not limited to the message display of the display device 96, and may be performed by using an alarm sound or the like by the speaker 97 in combination.

The operation change determining unit 145 determines whether or not the driver has changed the operating in response to the operating change request by the operation change requesting unit 140. The operation change determining unit 145 is one example of the operation input acquiring unit of the present disclosure. Specifically, the operation change determining unit 145 determines that the driver has changed the operating when the depression of the brake pedal by the driver is detected based on the detection result of the brake sensor 23. The operation change determining unit 145 transmits the determination result to the brake hold forced release control unit 150 and determination threshold-time correcting unit 170, which will be described later, respectively. Note that the method of determining the operating change is not limited to the depression of the brake pedal, and it may be determined that the driver has changed the driving when the driver performs some kind of response operation such as pressing a confirmation button with respect to a message prompting the braking operation displayed on the display device 96.

The brake hold forced release control unit 150 is one example of the stop hold release control unit of the present disclosure, and executes a forcible release control for forcibly releasing the brake hold control being executed. Specifically, the brake hold forced release control unit 150 immediately releases the brake hold control being executed when the driver changes the operation in response to the operating change request by the operation change requesting unit 140. On the other hand, when the driver does not change the operation in response to the operating change request by the operation change requesting unit 140, the brake hold forced release control unit 150 forcibly releases the brake hold control being executed at a time point when a predetermined first threshold-time T1 has elapsed since the start of the operating change request. Here, the first threshold-time T1 is set in a time (for example, several seconds) shorter than the time required for the drivers to get off the vehicle SV. That is, when the driver does not change operation, the brake-hold control is forcibly released prior to the driver getting off the vehicle SV. This makes it possible to effectively prevent the driver from getting off before the brake hold control is forcibly released.

The driver abnormality determining unit 160 determines, based on the driver condition information transmitted from the driver condition recognition device 35, whether the driver is in an abnormal state in which the vehicle SV cannot be normally driven due to a doze, a seizure, or the like. Specifically, the driver abnormality determining unit 160 acquires whether the driver is in a specific condition based on the driver condition information transmitted from the driver condition recognition device 35. Here, the specific condition includes, for example, a state in which the driver closes his/her eyes, a state in which the driver directs his/her line of sight in a direction other than the front direction, and the like. The driver abnormality determining unit 160 determines that an abnormality has occurred in the driver when the specific condition of the driver is acquired continuously for a predetermined determination threshold-time Tth or longer. The determination threshold-time Tth is not particularly limited, but is preferably set to a time of, for example, about ten seconds to several tens of seconds in order to prevent erroneous determination that a short-time closed eye or the like is abnormal. When determining that the abnormality has occurred in the driver, the driver abnormality determining unit 160 transmits a "driver abnormality signal" indicating that the driver is in an abnormal state to the emergency control unit 180 described later.

The determination threshold-time correcting unit 170 is one example of the determination correction unit of the present disclosure, and executes the threshold correction for decreasing the above-described determination threshold-time Tth when the driver does not change the operation even after forcibly releasing the brake hold control in response to the operating change request by the operation change requesting unit 140. In order to prevent the driver from getting off, an operating change request is made, and even when the brake hold control is forcibly released, when the driver does not change the operation, it can be said that there is a high possibility that the abnormality has occurred in the driver. In such a case, it is desired that the driver abnormality determining unit 160 determines that the driver is abnormal at an early stage.

The determination threshold-time correcting unit 170 executes threshold correction for subtracting the predetermined time Tv from the determination threshold time Tth (=Tth−Tv) when the driver does not change the operation even after the predetermined second threshold time T2 elapses from the beginning of the operating change request. The second threshold time T2 is not particularly limited, but may be a time longer than the first threshold time T1 described above, and may be set based on a time (for example, several tens of seconds) during which a normal driver can respond to an operating change request. Thus, if the driver is suspected of having an abnormality, the determination threshold time Tth is decreased to make it easier to determine that the driver is in an abnormal state, thereby enabling more sensitive detection of driver abnormality and reliably improving determination accuracy. Note that the determination threshold-time correcting unit 170 can forcibly cause the driver abnormality determining unit 160 to determine that the driver is in the abnormal state instead of decreasing the determination threshold time Tth when the driver does not change the operation even after the predetermined second threshold time T2 has elapsed since the start of the operating change request.

Upon receiving the driver abnormality signal from the driver abnormality determining unit 160, the emergency control unit 180 executes an emergency control for securing the safety of the driver and the vehicle SV. The specific content of the emergency control is not particularly limited, and examples thereof include a stop control for moving the vehicle SV to a safe location and stopping the vehicle SV, a blinking control for blinking the hazard lamps 90 and 91 to notify that the driver is in the abnormal state, and a help net notification for notifying the help net center that own vehicle SV is in an abnormal state.

Figure 3:
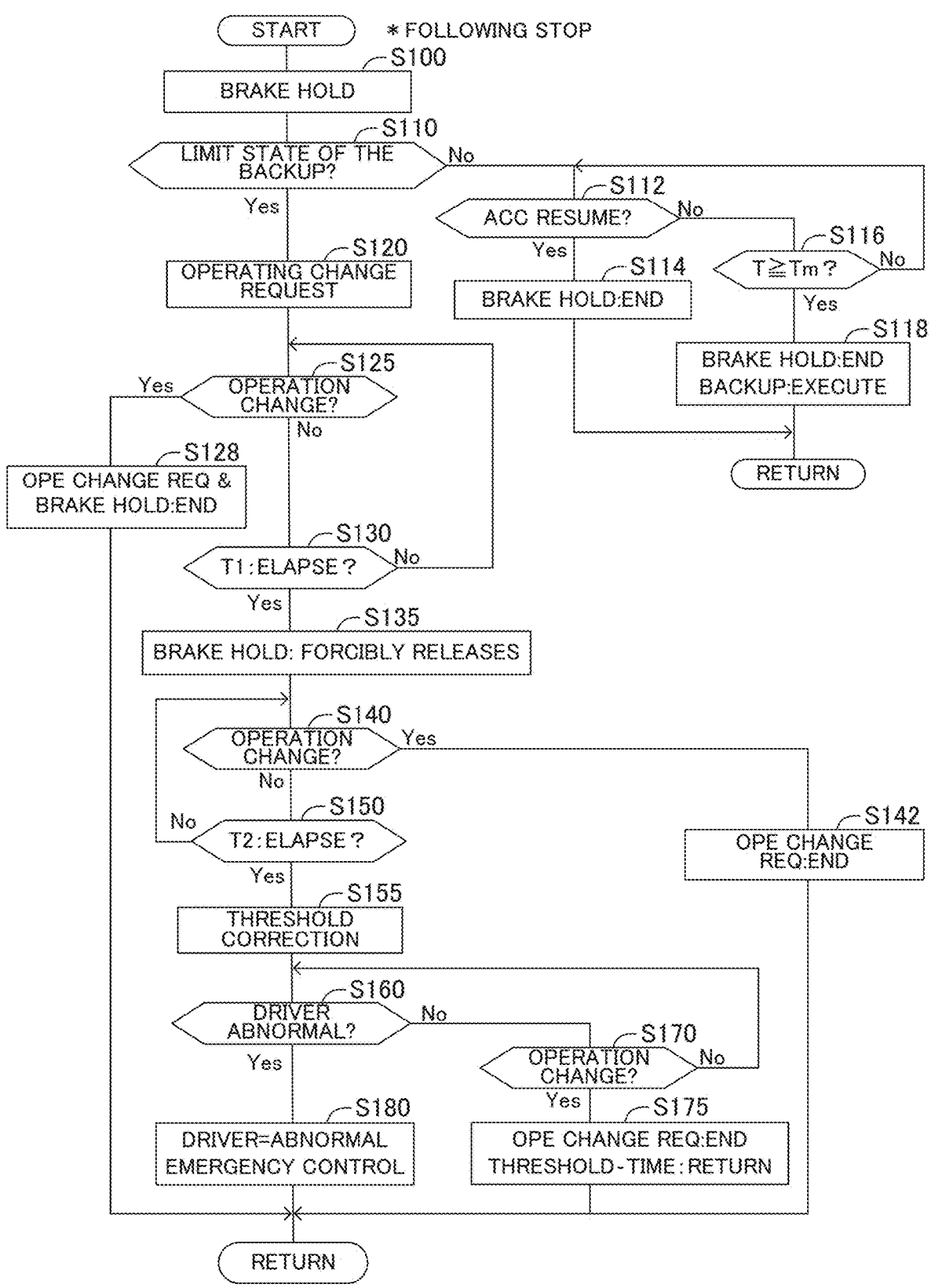
FIG. 3 is a flow chart for explaining a routine of a control device according to the present embodiment.

FIG. 3 is a flow chart for explaining routines of brake hold control, operating change request process, and threshold correction process executed by the CPU 11 of the ECU 10. The routine shown in FIG. 3 is started when the own vehicle SV stops following the stop of the preceding vehicle by the following travel control of ACC, that is, when the above-described execution condition (2) is satisfied.

In step S100, the ECU 10 executes a brake hold control for holding the vehicle SV in a stopped condition by the hydraulic brake apparatus 60. Next, in step S110, the ECU 10 determines whether at least one of the backup abnormality signal and the steep slope signal has been received, that is, whether the limit state of the backup control has been detected. When the limit state of the backup control is detected (Yes), the ECU 10 advances the process to step S120. On the other hand, if the limit state of the backup control is not detected (No), the ECU 10 advances the process to step to S112 of steps.

In step S112, the ECU 10 determines whether the above-described end condition (2), that is, ACC resume operation is done. If the resume operation has been done (Yes), the ECU 10 advances the process to step S114 terminates the brake hold control, and returns this routine. On the other hand, if the resume operation is not done (No), the ECU 10 advances the process to step S116 and determines whether the above-described end condition (3), that is, the brake hold control execution time T has reached the upper limit threshold time Tm. When the brake hold control execution time T reaches the upper limit threshold time Tm (Yes), the ECU 10 advances the process to step S118, ends the brake hold control, executes the backup control, and returns this routine. On the other hand, if the brake hold control execution time T has not reached the upper limit threshold time Tm (No), the ECU 10 returns the process to step S112.

In step S120, the ECU 10 executes the operating change request that prompts the driver to change the operation. Next, in step S125, the ECU 10 determines whether the drivers have changed operation. When the driver has changed the operation (Yes), the ECU 10 advances the process to step S128, ends the operating change request and the brake hold control, and returns this routine. On the other hand, when the drivers do not change driving (No), the ECU 10 advances the process to step S130.

In step S130, the ECU 10 determines whether the first threshold-time T1 has elapsed since the start of the operating change request in step S120. If the first threshold-time T1 has not elapsed (No), the ECU 10 returns the process to step S125. On the other hand, when the first threshold-time T1 has elapsed (Yes), the ECU 10 advances the process to step S135 and forcibly releases the brake hold control. At this time, the operating change request is continuously executed.

Next, in step S140, the ECU 10 determines whether the driver has changed the operation as the brake hold control is forcibly released. When the driver has changed the operation (Yes), the ECU 10 advances the process to step S142, ends the operating change request, and returns this routine. On the other hand, when the drivers do not change driving (No), the ECU 10 advances the process to step S150.

In step S150, the ECU 10 determines whether the second threshold-time T2 has elapsed since the start of the operating change request in step S120. If the second threshold-time T2 has not elapsed (No), the ECU 10 returns the process to step S140. On the other hand, when the second threshold-time T2 has elapsed (Yes), the ECU 10 advances the process to step S155.

In step S155, the ECU 10 executes threshold correction for subtracting the predetermined time Tv from the determination threshold time Tth. Next, in step S160, the ECU 10 determines whether the abnormality has occurred in the drivers based on the correction determination threshold times (=Tth−Tv). If it is determined that the abnormality has occurred in the driver (Yes), the ECU 10 advances the process to step S180, determines the abnormality of the driver, executes emergency control, and returns this routine. On the other hand, if it is determined that no anomaly has occurred in the drivers (No), the ECU 10 advances the process to step S170.

In step S170, the ECU 10 determines whether the driver have changed operation. If the driver do not change the operation (No), the ECU 10 returns the process to step S160. On the other hand, when the driver changes the operation (Yes), the ECU 10 advances the process to step S175, ends the operating change request, returns the determination threshold-time Tth to the pre-correction state, and returns this routine.

MODIFICATION

Figure 4:
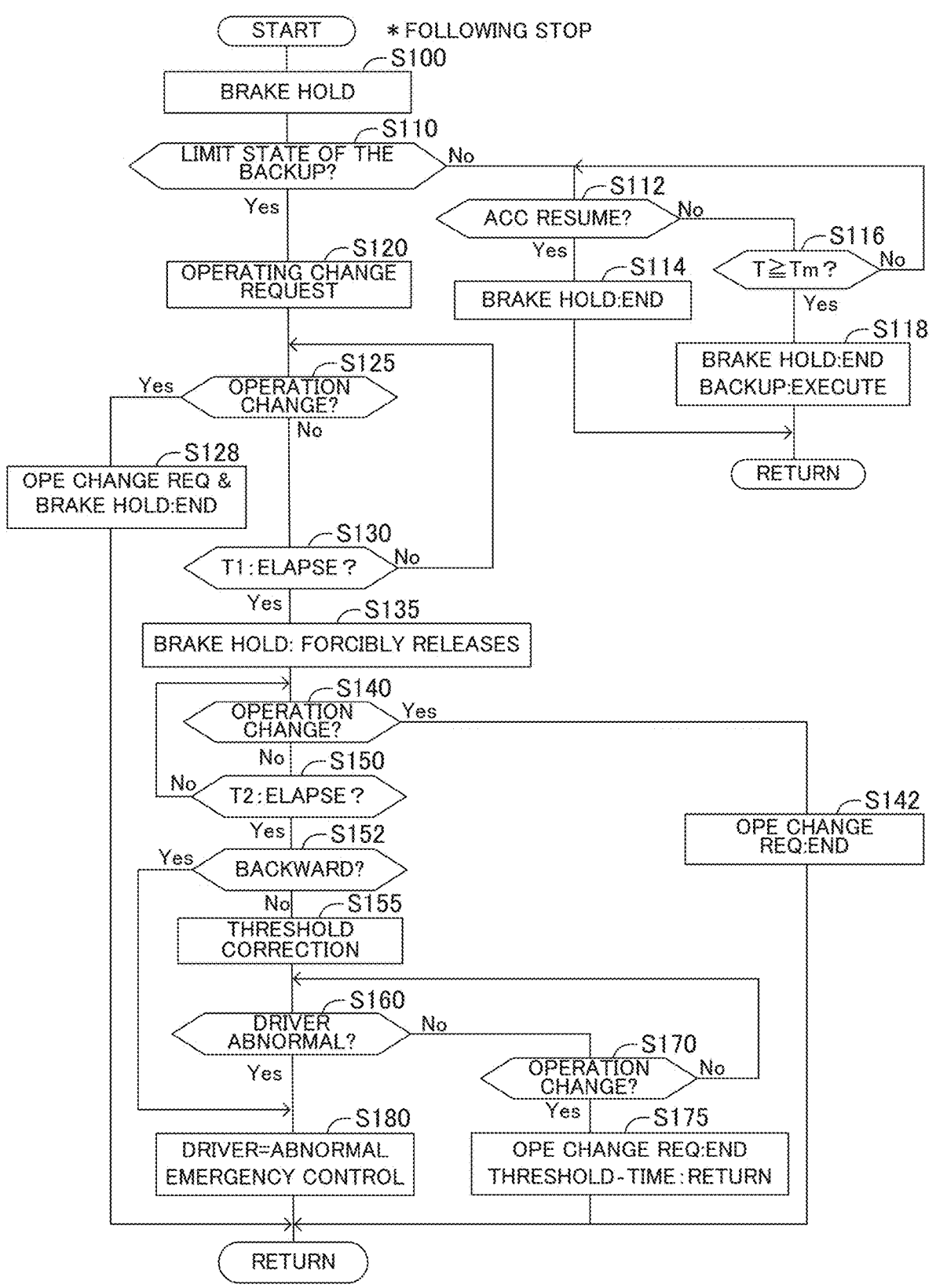
FIG. 4 is a flow chart for explaining a routine of a control device according to a modification.

FIG. 4 is a flow chart for explaining routines of brake hold control, operating change request process, and threshold correction process according to a modification. Specifically, in the flow of the modification, the determination process of the step S152 is added between the step S150 and the step S155 of the flow shown in FIG. 3. Since the other processes are the same as those in FIG. 3, the description thereof will be omitted.

In step S152, the ECU 10 determines whether the vehicle SV is moved backward. When the vehicle SV is stopped on a steep uphill slope, the brake hold control is forcibly released, and when the driver does not change the operation despite the vehicle SV being retracted, it is highly likely that the driver is in an abnormal condition. For this reason, it is desired to determine an abnormality of the driver at an early stage as compared to when the vehicle SV is moving forward. When the ECU 10 determines in step S152 that the vehicle SV is moving backward (Yes), the ECU 10 advances the process to step S180 to determine an abnormality of the driver, executes emergency control, and return this routine. On the other hand, when the ECU 10 determines that the vehicle SV is not moving backward (No), the ECU 10 advances the process to step S155. In general, the peripheral monitoring capability of the external sensor device 30 is lower at the rear of the vehicle than at the front. For this reason, as in the modification, if an abnormality of the driver is determined at an early stage when the vehicle SV is retracted, and the emergency control is started at an early stage, the safety can be further improved.

OTHER

In the above, the vehicle control device according to the at least one embodiment have been described, but the present disclosure is not limited to the above-mentioned at least one embodiment, and various modifications are possible within the range not departing from the object of the present disclosure. For example, the flow shown in FIGS. 3 and 4 can also execute the same process when the above-described execution condition (1) is satisfied, that is, when the driver stops the vehicle SV while the automatic hold switch is ON, or when the driver turned on the automatic hold switch after the vehicle SV is stopped while the automatic hold switch is OFF.

What is claimed is:

1. A vehicle control device comprising:

a memory storing instructions; and at least one processor configured to execute the instructions to:

obtain driver state information and monitor whether a driver is in a specific condition based on the driver state information;

determine that the driver is in an abnormal state when the specific condition continues for at least a determination threshold time;

execute a brake hold control for holding a vehicle at a stop by maintaining a braking force by activating a brake apparatus, wherein the brake apparatus is a hydraulic brake apparatus, and the brake hold control being terminated when a predetermined release condition of the brake hold control is satisfied;

execute, when the brake hold control is terminated, a backup holding control for holding the vehicle at the stop;

execute a backup control for holding the vehicle in a stopped state by activating at least one of an electric parking brake apparatus or a parking lock apparatus;

detect, while the brake hold control is being executed, whether the backup holding control can be executed, and determine that a backup abnormal state has occurred when at least one of the electric parking brake apparatus and the parking lock apparatus is unable to operate, wherein execute an operation change request process, when the predetermined release condition is satisfied and when the vehicle control device is in a predetermined state in which the vehicle control device cannot execute a backup control request to prompt the driver to perform a brake operation, and when the backup abnormal state is determined during execution of the brake hold control;

terminate the brake hold control, when a driver operation input in response to an operation change request is detected within a first threshold time from a start of the operation change request;

decrease the determination threshold time, when the driver operation input is not detected within a second threshold time longer than the first threshold time from the start of the operation change request; and determine that the driver is in the abnormal state when the specific condition continues for at least the decreased determination threshold time.

* * * * *